US008561071B2

(12) United States Patent
Leymann et al.

(10) Patent No.: US 8,561,071 B2
(45) Date of Patent: Oct. 15, 2013

(54) PROCESS INSTANCE SERIALIZATION

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 1505 days.

(21) Appl. No.: 11/427,511

(22) Filed: Jun. 29, 2006

(65) Prior Publication Data

US 2007/0157204 A1    Jul. 5, 2007

(30) Foreign Application Priority Data

Jul. 11, 2005  (EP) .................................. 05106287

(51) Int. Cl.
*G06F 9/46*  (2006.01)

(52) U.S. Cl.
USPC .......................................... 718/102; 718/100

(58) Field of Classification Search
USPC .................. 718/100, 101, 102, 106, 104, 107
See application file for complete search history.

(56) References Cited

U.S. PATENT DOCUMENTS

| 5,559,979 | A  | * | 9/1996  | Shiga et al. ................... 711/218 |
| 5,630,136 | A  | * | 5/1997  | Davidson et al. ............. 718/106 |
| 5,873,099 | A  | * | 2/1999  | Hogan et al. ........................ 1/1 |
| 5,895,492 | A  | * | 4/1999  | Greenspan et al. ........... 711/147 |
| 6,415,297 | B1 | * | 7/2002  | Leymann et al. .............. 707/608 |
| 6,947,047 | B1 | * | 9/2005  | Moy et al. ...................... 345/501 |
| 7,127,567 | B2 | * | 10/2006 | Ramakrishnan et al. ..... 711/152 |
| 7,681,197 | B1 | * | 3/2010  | Kinnear ......................... 718/104 |
| 2003/0217094 | A1 | * | 11/2003 | Andrews et al. .............. 709/201 |
| 2004/0153350 | A1 |   | 8/2004  | Kim et al. |

FOREIGN PATENT DOCUMENTS

| EP | 0778535 A2  | 11/1997 |
| EP | 0872805 A2  | 10/1998 |
| EP | 0903678 A2  | 3/1999  |
| WO | 01/11509 A2 | 2/2001  |

* cited by examiner

*Primary Examiner* — Emerson Puente
*Assistant Examiner* — Willy W Huaracha
(74) *Attorney, Agent, or Firm* — Jordan IP Law, LLC

(57) ABSTRACT

Method and system for serializing access to datasets, suitable for use in a workflow management system which executes multiple business processes, wherein a single process instance is enabled to invoke web services which may update datasets of different storages holding redundant information. Business Process Execution Language for Web Services allows defining business processes that make use of web services and business processes that externalize their functionality as web services. As the business process has no knowledge about data that is accessed by invoked web services, concurrent process instances may update the same pieces of information within a database. Unless access to the data is carried out as a transaction, parallel execution of the process instances may cause data inconsistencies, which may be avoided by serializing the execution of process in stances based on correlation information associated with messages consumed by the process instances.

15 Claims, 5 Drawing Sheets

PROCESS INSTANCE SERIALIZATION

FIELD OF THE INVENTION

The present invention relates to a Workflow Management System (WFMS) and computer systems with comparable functionality. More particularly, the invention relates to methods, apparatus, and computer program products for serializing the execution of business processes.

BACKGROUND

Workflow Management Systems (WFMS) support the modeling and execution of business processes. Business processes executed within a WFMS environment specify which piece of work is carried out in what sequence. The individual pieces of work might be distributed across a multitude of different computer systems connected by some type of network.

IBM WebSphere Business Process Choreographer represents such a typical modern, sophisticated, and powerful workflow management system. It supports the definition of business processes as a network of activities. The network, the process model, is constructed from a set of activities, which define the individual tasks that need to be carried out. Definition of a process graph is via a graphical editor, or a flow definition language, such as Business Process Execution Language for Web Services (BPEL4WS). In this language, the activities are described as Web Services, defined via the Web Services Definition Language (WSDL).

For performance reasons, different instances of the same business process model are carried out in parallel, because serializing the execution of different instances would severely limit the throughput of the system.

In general, the parallel execution of process instances does not create any problems. However, there are situations where the parallel execution of a set of process instances could result in inconsistent information managed by the process instances themselves or by the Web services invoked by such process instances.

As the workflow management system carries out the individual business process instances invoke the Web Services without any knowledge of what the invoked web services do, certain anomalies and inconsistencies in the data managed by the invoked Web Services may occur.

For example, it is possible that several business process instances executed in parallel invoke the same set of Web Services with the same set of data. If the invoked set of Web services use the passed information to update databases, it is possible that the information stored in a database shared between these process instances or in a set of databases becomes inconsistent due to the possibly interleaved update actions of the different Web services.

FIG. 1 shows a prior art WFMS system 10 that invokes several Web Services 12A-12C (1 to N) which access two different databases 14A, 14B, and respective tables 16 and 18. It should be noted that the usage of a database management system, in particular a relational database management, is for illustration purpose only; any other mechanism that provides for the storage, persistent or non-persistent, can be used. Those Web Services are defined as activities within an appropriate process model. When the WFMS carries out process instances of the process model it navigates through the process graph, determines the appropriate activities, and invokes the associated Web Service. As shown, those Web Services update data in the shown databases; this is expressed symbolically by arrows pointing to the databases.

FIG. 3 illustrates, in a timeline from top to bottom, a prior art method wherein two different process instances update two tables 18 comprising redundant information for a single customer person within respective two different database systems 14A, 14B maintained according to prior art in an enterprise.

For example, assume that two business process instances are carried out for the same customer number "1234" as a result of two requests for the update of the address of the same customer number 1234. Let us further assume that the first request creates process instance 1 to change the address to Short Street, Dallas, and the second request creates process instance 2 to change the address to Middle Street, Dallas. In this case it is possible that the execution sequence of the different invoked Web services is the following: Process instance1 invokes system 1 process instance 2 invokes system process instance 2 invokes system 2, and process instance 1 invokes system 2. The net result is that the address of the customer with the customer number 1234 in system 1 is Middle Street, Dallas, and in system 2 is Short Street, Dallas.

A straightforward approach to solving this data inconsistency problem might be to change the implementation of the workflow management system in such a way that all process instances for the process model are carried out sequentially. This option is certainly not a good option for any workflow management system that needs to sustain a demanding load, as the performance of the WFMS is substantially decreased.

Thus there is a need for a method and a respective system for serializing the access to information which is stored redundantly in at least two datastores, which avoids inconsistencies in the two datastores while at the same time maximizes the degree of parallel execution of process instances.

SUMMARY

One aspect of the present invention is to serialize the datastore accesses performed by multiple concurrently executed process instances of the same process model only in the limited situations where variables or parts of variables have the same value in the concurrently executed process instances. Here, serialization means that the workflow management system carries out one process instance after the other instead of concurrently.

The term "datastore" shall be understood to include any storage device and the associated access software and hardware, as the invention is totally independent of the type of storage in use. So, for example, relational or hierarchical databases and filesystem-based storage structures are typical representatives thereof.

The term "variable" is hereby to be understood in the sense as it is commonly used in a programming language. Part of variable relates to parts of complex structures as for example the "struct" option in C-Programming language which allows a variable to have an inner, often hierarchical structure.

An appropriate definition for a variable part "customer number" in the "customer address" variable that is used for controlling serialization may look like the following code fragment:

```
<process name="updateAddresses"
  serializedByVar="customerAddress\customerNumber">
```

The "serializedByVar" attribute indicates that concurrently executing process instances of the appropriate process model that have the same value in the variable or part of the variable specified by the attribute are to be serialized. If, for example, two concurrently executing process instances of the "updateAddresses" process model have the value of "1234" in the customerNumber part of the customerAddress variable, then the workflow management system serializes the execution of those concurrently executing process instances. Furthermore, the specification of variables that causes serialization is not limited to a single variable, but can be a set of variables; thus, one could specify several variables in the "serializedByVar" attribute. Furthermore, different options may be defined, such as conditional comparison of the set members for taking the decision, whether or not serialization should take place. Such a conditional comparison could be:

```
serializedByVar="customerTown OR customerNum-
    ber"
``` which indicates that two concurrently executing process instances are only serialized if they both have the same value for the customerNumber or the customerTown.

This inventive approach limits the serialized execution of work only to occurrences of conflicting accesses to the same set of information managed in the different datastores. As this situation is typically rather limited, the performance impact of serialization is minimal.

In many cases, only parts of the process instances need to be serialized, which means that the access to the redundant data is carried out only in small parts of the business process. BPEL4WS uses the notion of scopes for such parts to group a set of activities and to assign properties to the set of activities. Such serialization only when the execution is within such a scope may be specified as:

```
<scope
    serializedByVar="customerAddress\customerNumber">
    set of activities
</scope>
```

This has the additional advantage that serialization is limited to the time the scope is being carried out.

In an alternative approach the same effect of serializing the execution of concurrently executing process instances can be achieved by using fields within received messages instead of variables or parts of variables.

An appropriate definition for a part "customer number" in the "customer address" message that is used for controlling serialization may took like the following code fragment.

```
<process name="updateAddresses"
    serializedByMsgVar="customerAddress\customerNumber">
```

The "serializedByMsgVar" attribute accepts the same specification as the "serializedByVar" attribute. If a message is received, and the value of the field or the values of set of fields specified with the attribute are identical to the value of the field or values of the set of fields of a message that is currently processed by a process instance, processing of the message is delayed until the currently executing process instance finishes.

Similarly, as for the specification of the "serializedByVar" attribute, specification of the "serializedByMsgVar" attribute is supported on the scope level.

As a further refinement, one could use correlation sets associated with the input message instead of specifying the fields in the input message. Correlation sets define a set of fields in messages, which are used to identify a particular instance of some resource. A resource could be everything from a simple servlet that accesses a database to a full-fledged Web Service.

In particular, correlation sets iii BPEL4WS provide a means to identify business process instances via fields in messages sent to the business process, for example by a Web Service or emitted from the business process. According to the following embodiments this BPEL4WS option is exploited for serialization purposes.

For example, a business process may define the customer number as a correlation field. This requires the following definitions in the appropriate WSDL file:

```
<bpws:property name="customerNumber"
    type="xsd:integer/>
<bpws:propertyAlias name="customerNumber"
    messageType="customerAddressMessage"
    part="customerNumber"/>
```

This small code section defines a property to be used in correlation sets and where this property is to be located in a particular message. In the example, the property is the field customerNumber, which is located in the appropriate field in the appropriate message.

The properties are then used within the business process to define correlation sets as shown in the following code section that is added to a given business process definition:

```
<correlationSets>
    <correlationSet name="customerNumber">
        properties="customerNumber"/>
</correlationSets>
```

The initialization of a correlation set is specified together with a specific activity. In the example, the initial <receive> activity would need to be modified as shown in the following code section. The "initiate" attribute indicates that the correlation set is initialized when the activity is being carried out:

```
<receive name="updateSystems"
        partnerLink="requestor"
        portType="updateAddressPT"
        operation="request"
        variable="customerAddress">
    <correlations>
        <correlation set="customerNumber"
                initiate="yes"/>
    </correlations>
</receive>
```

The following code section illustrates how correlation sets are used in this embodiment to serialize the execution of process instances:

```
<process name="updateAddresses"
    serializedByCorrelation="customerNumber">
```

So far the description concerns how complete process instances may be serialized.

In the given example it may be sufficient to serialize just parts of process instances. This can be done by using "scopes"

and associating the serialization specifications with the scope. A definition may look like the following:

```
<scope name="requests
        serializeByCorrelation="customerNumber">
    <invoke name="updateSystem1"
            partnerLink="system1"
            portType="system1PT"
            operation="update"
            variable="customerAddress"/>
    <invoke name="updateSystem2"
            partnerLink="system2"
            portType="system2PT"
            operation="update"
            variable="customerAddress"/>
</scope>
```

A useful application of the inventive method can be achieved in WFMSs, which invoke Web Services, as the inclusion thereof into a workflow is explicitly supported by BPEL4WS.

Implementing the proposed changes in a prior art WFMS or in an application that includes a WFMS-like component may be done as a further functional add-in component. The workflow management system or the application program embedding a WFMS may, for example, maintain a table, herein denoted as "status table 50", with at least one entry per process instance, wherein the necessary fields are stored. Each entry contains at least the values of the fields that are used for serializing the process instance or scope within a process instance and a process instance ID for identifying the appropriate process instance and a status field, which may take values like "available", "not available for others", "completed", "pending", "enqueued", and so forth, that describes the current state of the process instance, and possibly further attributes.

Processing depends on whether message input variables/correlation sets or variables are used for serialization.

If message input variables are used, in particular if specified via correlation sets, and a new message arrives, the WFMS checks immediately whether a process instance with the same set of values is currently executing by looking up the status table. If such a process instance is currently being carried out, processing of the message is suspended until the currently running process instance has completed the appropriate processing. Completion of the processing may be either by leaving the scope if serialization is on scope level, or by finishing the process. After completion, the waiting message is processed.

If variables are used for serialization, the WFMS checks, after new values have been assigned to the serialization-relevant variables, whether those new values are the same as those of another running process instance. If so, navigation stops until the other process instance has finished processing, either by leaving the scope if scope level serialization is active, or after the process instance finishes. After processing has finished, navigation continues. One way of implementing the signaling of completion of the currently running process instance and continuation of navigation with the new process instance is by having the completing process instance updating the status table. An appropriate database trigger could then signal this change to the WFMS component that handles navigation or incoming message processing.

The present invention has particular advantages in web related environments wherein a process instance may invoke a web service in order to perform some predetermined task. This is because the request/response scheme of web services include messages to be processed by the WFMS which arrive asynchronously and unpredictably in time in relation to the order and time in which they were invoked from within the WFMS.

BRIEF DESCRIPTION OF THE DRAWINGS

The present invention is now described in detail with reference to the drawings, in which.

DETAILED DESCRIPTION

Figure 1:
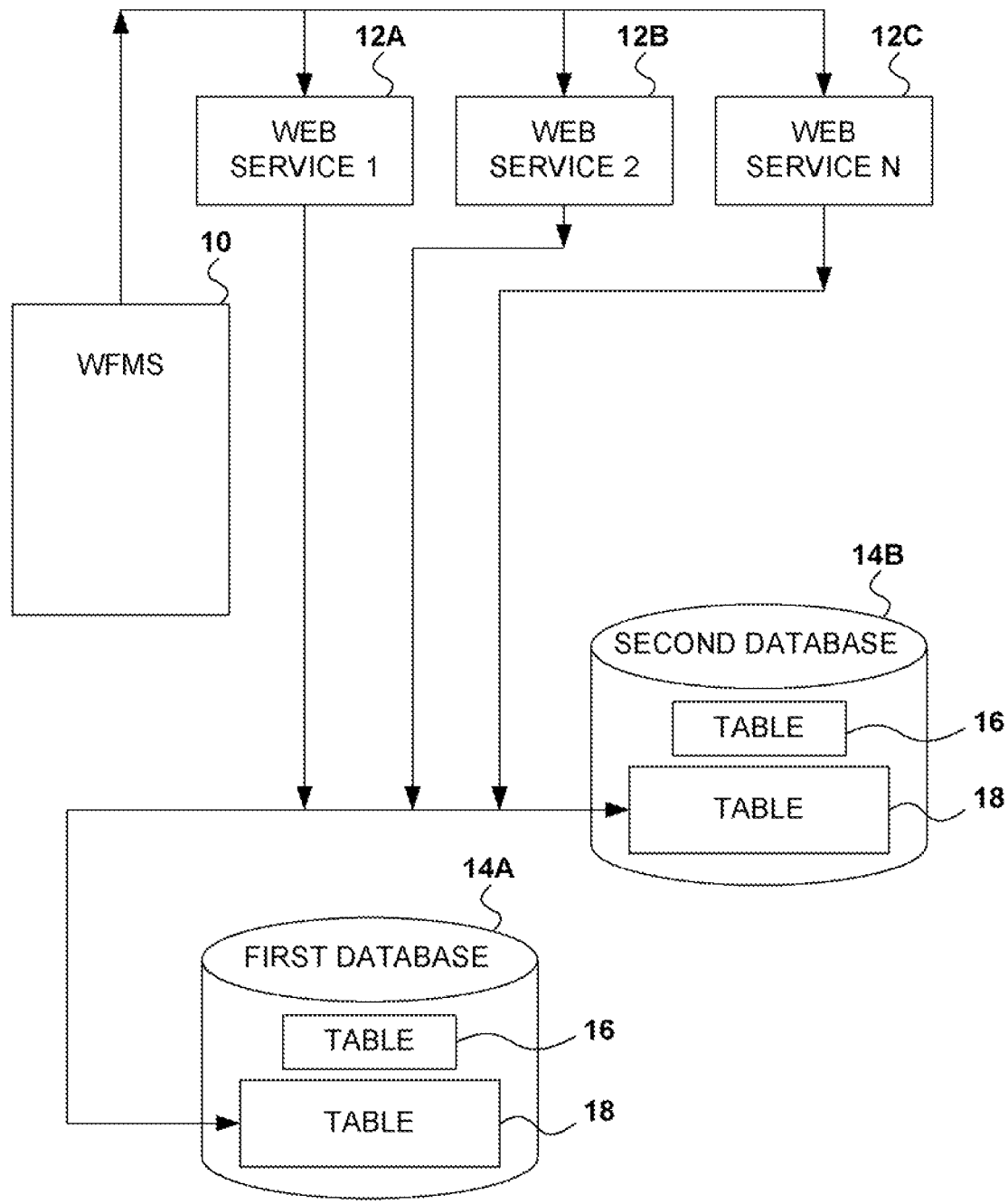
FIG. 1 is a schematic block diagram representation of a prior art WFMS system view shown to be cooperating with web services.
Figure 2:
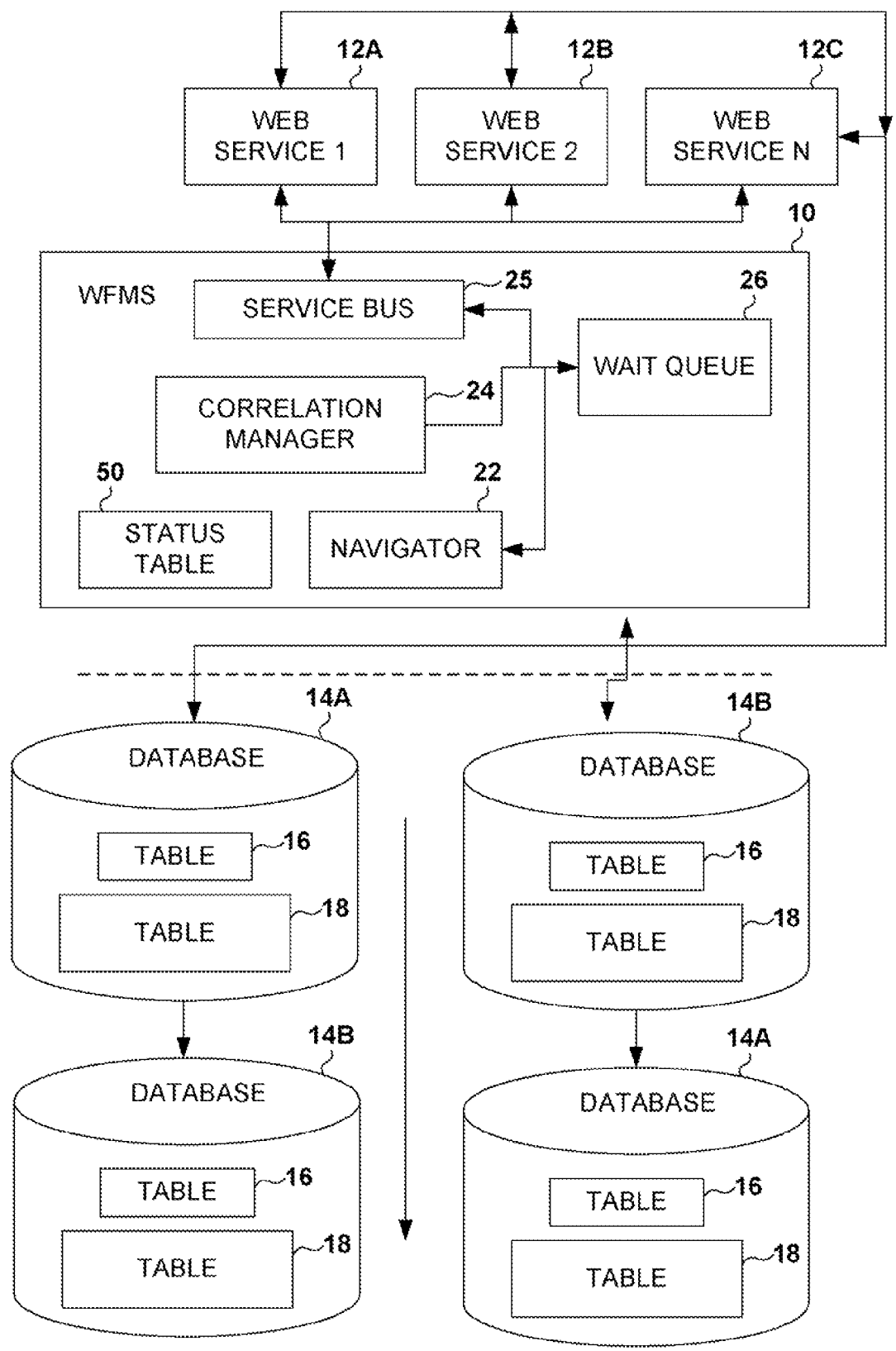
FIG. 2 is a representation according to FIG. 1, improved by a preferred embodiment of the present invention.
Figure 3:
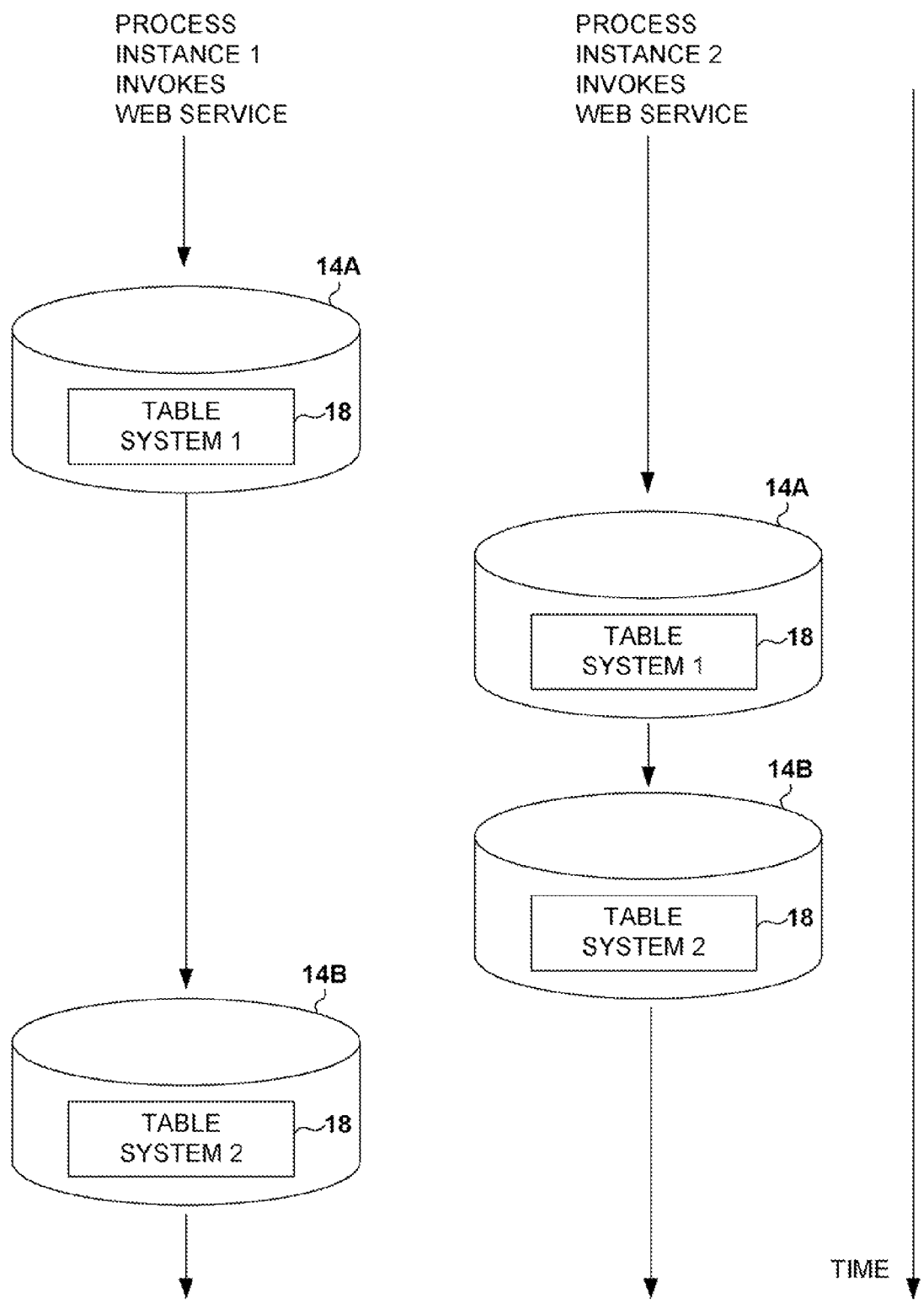
FIG. 3 illustrates, in a timeline from top to bottom, how two different process instances update two datasets within respective two different datastores (1, 2) maintained according to prior art in an enterprise for a single person.

With general reference to the figures and with special reference now to FIG. 2, a preferred embodiment is described in more detail which includes the orchestration of Web Services according to the industry norm BPEL4WS.

It implements a workflow management system (WFMS) 10 having amongst others a correlation manager component 24 and the navigator component 22. The WFMS invokes Web Services and receives requests/results from Web Services through the service bus component 25. This component knows the mechanisms that are being used to interact with a Web Service. In particular the service bus knows when a request/result is coming in from a Web Service, to which process model the request/reply belongs. After analyzing the request, it stores the request/reply with the process model information into the WFMS internal wait queue 26.

The correlation manager 24 reads the message from the queue and determines the process instance to which the message belongs. If process instance can be found in the correlation manager's status table 50, it obtains the appropriate process instance identifications and inserts a new message with the message and the fetched process instance identifier into the queue to be used by the navigator 22. The navigator reads the message from the queue, fetches the current process instance information from the WFMS internal database, determines the point in the process graph where the message is to be processed, and continues navigation through the process instance according to the definition of the underlying process model.

If the message is the start message of a process, and correlation is specified, the correlation manager creates a process instance, obtains correlation information, and stores the information together with the process instance identifier in the status table. It further creates a process instance identifier. It then inserts a message with the original data plus the process instance identifier into the queue as a request to the navigator to start a new process instance.

If the message is the start message of a process and no correlation is defined, the correlation manager just generates a process instance identifier and generates the message without storing any information in the status table.

Figure 5:
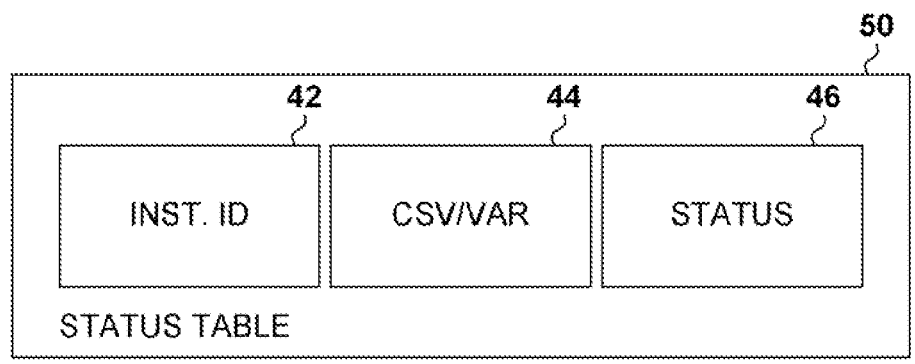
FIG. 5 is a block diagram showing parts of an inventive status table used for process instance serialization purposes.

With additional reference to FIG. 5, the status table 50 currently maintained by the correlation manager is enriched by the status field 46. Thus, it comprises an ID field 42 for identifying the process instance, and a status field 46, which may take values like: active, successful completed, queued, deleted, stopped without completion, and the like, and the values of the correlation sets or input message variable 44. Furthermore, the same or similar table is used by the navigation engine to determine if two concurrently executing process instance contain the same value in the specified variable. The value of the field 44 is evaluated to decide, if serialization is enabled and takes place or not, see the details later with reference to FIG. 6. In case more than one variable 44 are used jointly by a respective logical condition as mentioned further above, then the table 50 stores preferably all of the relevant variable values.

Figure 4:
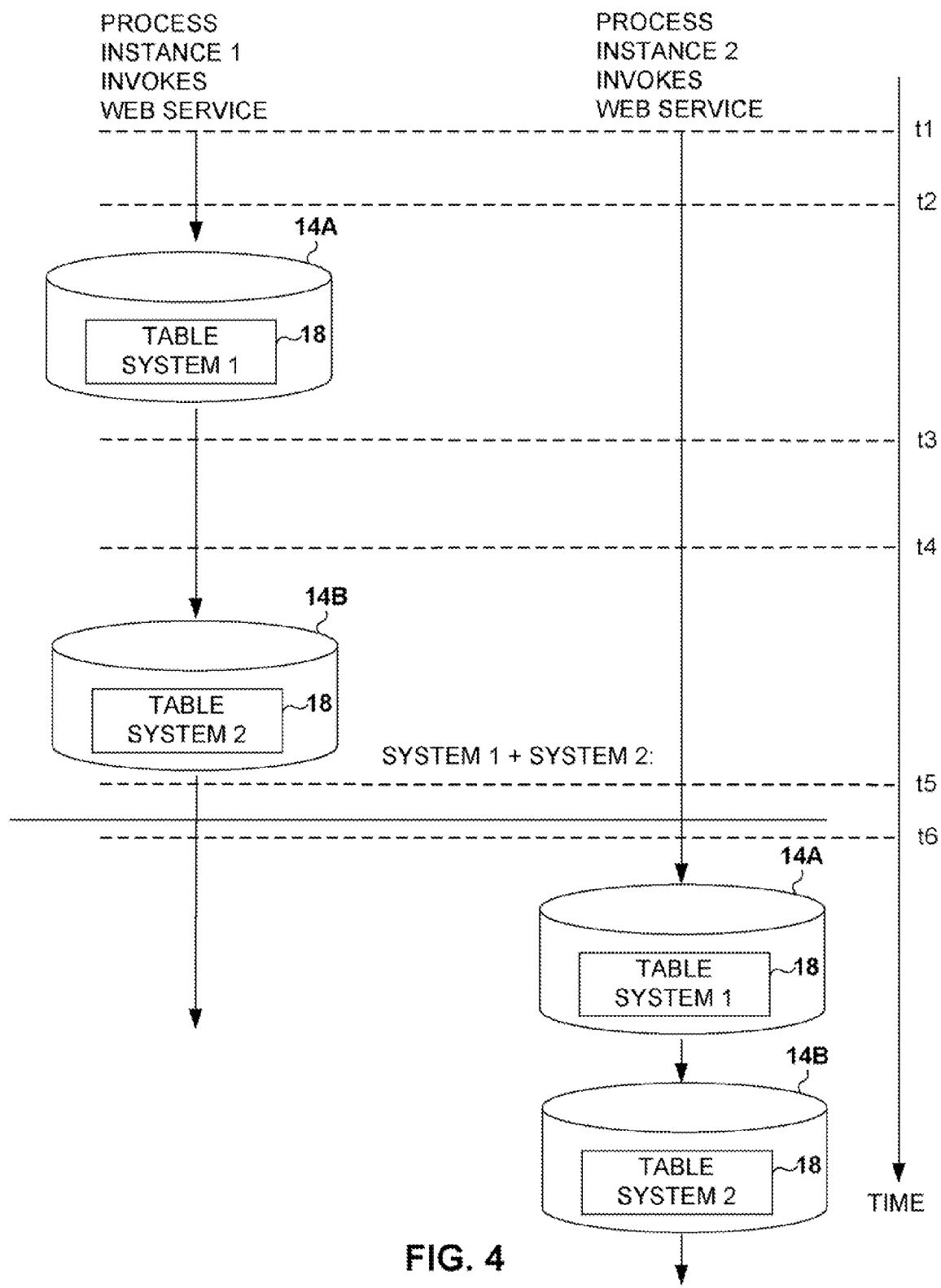
FIG. 4 is a representation according to FIG. 3, improved by a preferred embodiment of the present invention adapted for cooperation between WFMS and web services.
Figure 6:
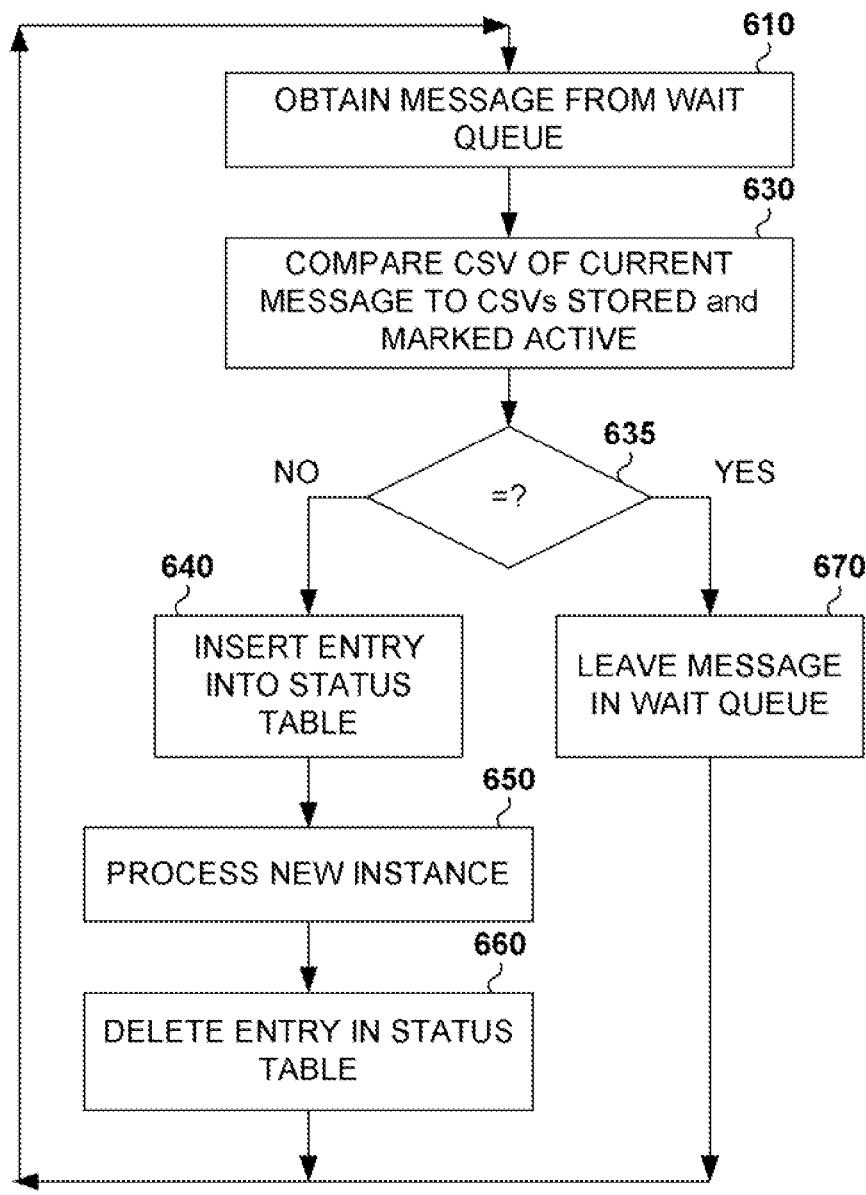
FIG. 6 is a control flow diagram illustrating the method according to a preferred embodiment of the invention.

With further reference to FIGS. 4 and 6, the control flow of the inventive method when implemented for serializing scopes, i.e., groups 40 of activities representing only parts of a process instance according to above example b), will be described next below. Serialization is assumed to be based on correlation sets (the same as input message variables). Serialization based on variables works substantially the same way, except that serialization is done by the navigation engine and not by the correlation set manager.

FIG. 4 shows a process consisting of two activities that invoke Web Services (not depicted) which perform an update of system 1 and an update of system 2 in a respective dataset 18, which in turn comprises redundant information such as, for example, business information like a customer address.

The correlation manager component 24 performs all essential control for avoiding data inconsistencies in an intended database update process for both systems 14A and 14B by serializing the execution of the two process instances.

In a step 610 and under use of standard techniques the correlation manager 24 obtains the next incoming message from the wait queue 26.

In a next step 630 the correlation manager performs a look-up of the status table 50 and determines whether any active process instance with the same set of values 44 is currently executing 635. If no such concurrent process instance is found, a new entry is inserted into the status table with the values of the correlation sets and an appropriate status (see step 640). This update has the effect of serializing the execution of business process instances with the same correlation set values.

Then the navigation manager processes the appropriate activities which access the appropriate databases 14A and 14B step 650, where the update is performed as mentioned further above. After completion of the process instance, the navigation manager deletes the appropriate entry in the correlation manager's status table, step 660.

With reference back to decision 635, if such an entry in the status table is found, this means that such a process instance is currently being carried out, then the YES-branch to step 670 is followed. In this case, the correlation manager 24 suspends the processing of the message until the currently running process instance has completed the appropriate processing. This is done by putting the message, or a handle to it into the wait queue 26.

A similar processing is carried out in the case wherein the serialization is performed only for a scope. In this case, the status table contains additional information about which scope is currently processed.

Further modifications of the inventive methods are disclosed as follows. The criteria which define coincidence may be defined including any other logical expression (AND OR, >,<, etc.) that can be evaluated by a WFMS. Instead of a status table 50, any other structure can be used; it should, however, enable quick access to the fields to be compared. Furthermore, it is not required that the table 50 be maintained in persistent storage. In particular, in the case of serialization by variable, the status table is preferably held in main memory.

The processing proposed here may be made the default behaviour of the workflow management system that supports BPEL4WS.

The present invention can be realized in hardware, software, or a combination of hardware and software. A serialization tool according to the present invention can be realized in a centralized fashion in one computer system, or in a distributed fashion where different elements are spread across several interconnected computer systems, or simply as an add-in within other programs. Any kind of computer system or other apparatus adapted for carrying out the methods described herein is suitable. A typical combination of hardware and software could be a general purpose computer system with a computer program that, when executed, controls the computer system such that it carries out the methods described herein.

The present invention can also be embedded in a computer program product, which comprises all the features enabling the implementation of the methods described herein, and which, when loaded in a computer system, is able to carry out these methods.

Computer program means or computer program in the present context mean any expression, in any language code, or notation, of a set of instructions intended to cause a system having an information processing capability to perform a particular function either directly or after either or both of the following: conversion to another language, code, or notation; and reproduction in a different material form.

What is claimed is:

1. A method for serializing the execution of process instances, suitable for use by a workflow management system in a networked computer environment which implements the execution of multiple instances of business processes using a common process model accessing at least two datastores holding redundant information, said method comprising:
    identifying at least one variable of the process model;
    managing, for each process instance, a current value of the identified variable and an ID of a respective process instance;
    determining if a new process instance specifies a value associated with the redundant information for the identified variable which is already maintained as a current value associated with the redundant information for a currently active process instance; and
    if the new process instance specifies the value for the identified variable which is already maintained as the current value for the currently active process instance, halting execution of the new process instance until the already active process instance has completed.

2. A method for serializing the execution of process instances suitable for use by a workflow management system in a networked computer environment which implements the execution of multiple instances of business processes of the same process model accessing at least two datastores holding redundant information, said method comprising:
    identifying at least one input message field of a message consumed by the process model;

maintaining, for each process instance, a current value of the input message field and the ID of a respective process instance;

determining if an incoming message triggering execution of a process instance specifies a value associated with the redundant information for the identified input message field which is already maintained for a currently executed process instance; and if one active process instance is found having the determined value for the identified input message field, halting processing of the incoming message until the already active process instance has completed.

3. The method according to claim 2, wherein input message fields are described by correlation sets.

4. The method according to claim 2, wherein serialization is performed for a part of a process instance.

5. The method according to claim 2, wherein a process instance is enabled to invoke web services which update information, wherein determining if an incoming message triggering execution of a process instance specifies a value for the identified input message field which is already maintained for a currently executed process instance is performed by looking up an incoming web message.

6. The method according to claim 2, wherein only a part of a process instance is halted.

7. The method according to claim 2, wherein, in identifying at least one input message field of a message consumed by the process model, a set of variables is processed wherein the variables are joint in a logical expression.

8. A computer system in a networked computer environment for serializing the execution of process instances, said computer system including a workflow management system which implements execution of multiple instances of business processes accessing two datastores holding redundant information, said computer system comprising:

a processor;

a memory operably connected with the processor;

at least two datastores operably connected with the processor; and a program stored on the memory and executable by the processor to create a status table means having at least one ID field and at least one correlation set variable field for tracking progress of a process instance when accessing at least one of the two datastores holding redundant information, the ID field to include, for each process instance, an ID of a respective process instance, and the correlation set variable field to include a current value of at least one input message field of a message consumed by a process model, wherein a determination is to be made via the status table means if an incoming message triggering execution of a process instance specifies a value associated with the redundant information for the input message field which is already maintained for a currently executed process instance, and wherein if one active process instance is found having the determined value for the identified input message field, processing of the incoming message is to be halted until the already active process instance has completed.

9. A computer system in a networked computer environment for serializing the execution of process instances, said computer system including a workflow management system which implements the execution of multiple instances of business processes accessing two datastores holding redundant information, said computer system comprising:

a processor;

a memory operably connected with the processor;

at least two datastores operably connected with the processor; and a program stored on the memory and executable by the processor, the program including a status table means having at least one ID field and at least one correlation variable field for tracking progress of a process instance when accessing at least one of the two datastores holding redundant information, the ID field to include, for each process instance, an ID of a respective process instance, and the correlation variable field to include a current value of at least one variable of a process model, wherein a determination is to be made via the status table means if a new process instance specifies a value associated with the redundant information for the variable which is already maintained as a current value for a currently active process instance, and wherein if the new process instance specifies the value for the variable which is already maintained as the current value for the currently active process instance, execution of the new process instance is to be halted until the already active process instance has completed.

10. A computer program product for serializing the execution of process instances in a workflow management system which implements the execution of multiple instances of business processes of the same process model accessing at least two datastores holding redundant information, the computer program product comprising a non-transitory computer usable storage medium having computer usable program code embodied therein, the program code comprising:

computer usable program code configured to identify at least one variable of a process model of a workflow management system;

computer usable program code configured to manage, for each process instance of the process model, a current value of the identified variable and an ID of a respective process instance;

computer usable program code configured to determine if a new process instance specifies a value associated with the redundant information for the identified variable which is already maintained as a current value for the identified variable for a currently active process instance; and computer usable program code configured to halt execution of the new process instance until the already active process instance has completed if the new process instance is determined to specify the value for the identified variable which is already maintained as the current value for the identified variable.

11. The method according to claim 1, wherein halting the execution of the new process instance is based on the determination if the new process instance specifies the value for the identified variable which is already maintained as the current value for the currently active process instance and is independent of employing a lock field.

12. The method according to claim 2, wherein halting the processing of the incoming message is based on the determination if the one active process instance is found having the determined value for the identified input message field and is independent of employing a lock field.

13. The computer system according to claim 8, further comprising a program stored on the memory and executable by the processor to maintain, for each process instance, a current value associated with the redundant information of the input message field and the ID of a respective process instance.

14. The computer system according to claim 9, further comprising a program stored on the memory and executable by the processor to maintain, for each process instance, a current value associated with the redundant information of the input message field and the ID of a respective process instance.

15. The computer program product according to claim 10, wherein the halt of the execution of the new process is to be based on the determination if the new process instance is determined to specify the value for the identified variable which is already maintained as the current value for the identified variable and is to be independent of employment of a lock field.

* * * * *